No. 617,659. Patented Jan. 10, 1899.
P. SHARKEY.
AXLE.
(Application filed Jan. 12, 1898.)
(No Model.)
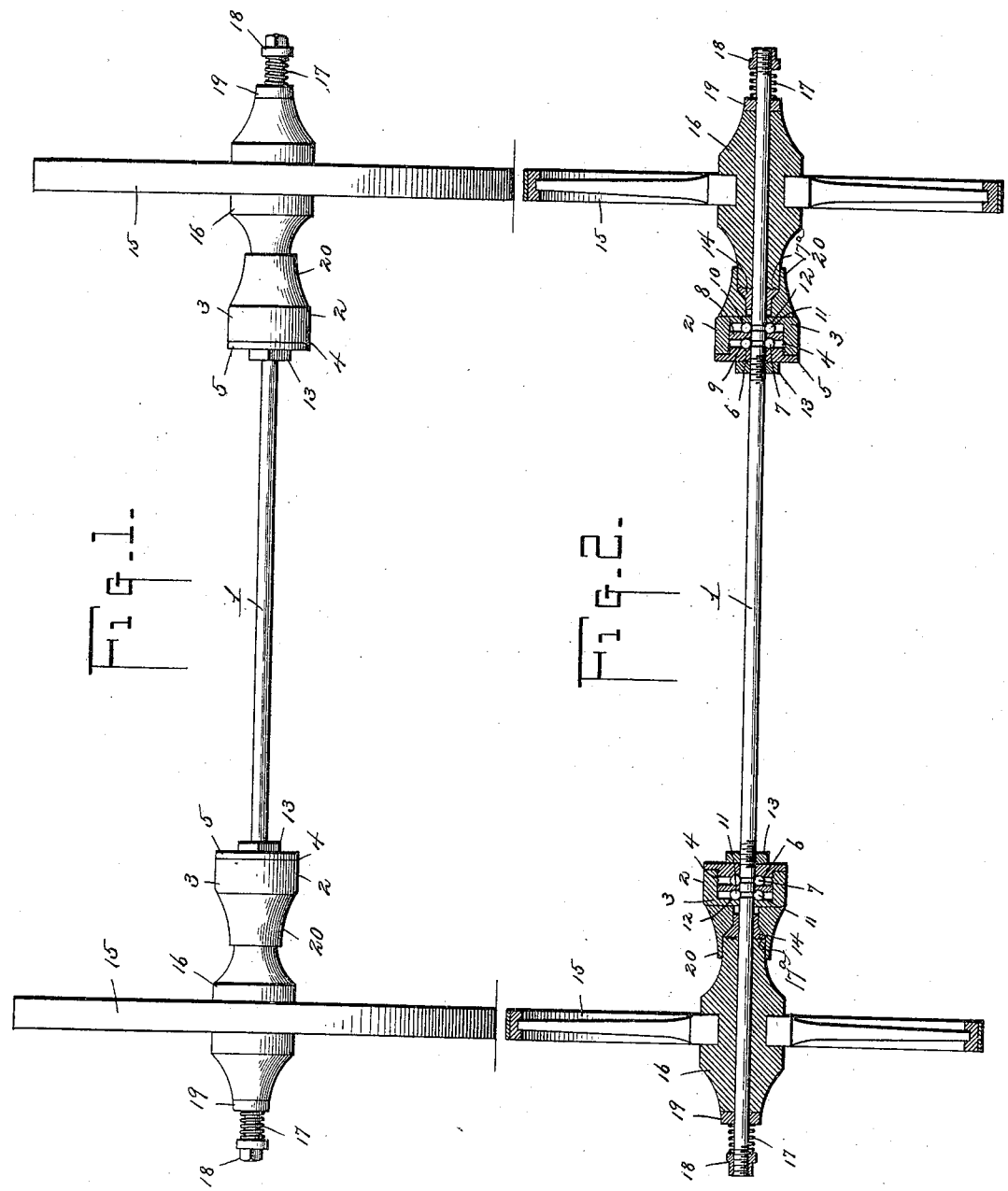
Witnesses
Harry L. Amel.
C. A. Walker.
Inventor
Patrick Sharkey,
by V. S. Stockbridge
his Attorney ically prefaced with a heading.

UNITED STATES PATENT OFFICE.

PATRICK SHARKEY, OF TRAFALGAR, INDIANA.

AXLE.

SPECIFICATION forming part of Letters Patent No. 617,659, dated January 10, 1899.

Application filed January 12, 1898. Serial No. 666,451. (No model.)

*To all whom it may concern:*

Be it known that I, PATRICK SHARKEY, a citizen of the United States, residing at Trafalgar, in the county of Johnson and State of Indiana, have invented certain new and useful Improvements in Axles; and I do hereby declare the following to be a full, clear, and exact description of the invention, such as will enable others skilled in the art to which it appertains to make and use the same.

My invention relates to improvements in running-gear for vehicles, the said improvements consisting, essentially, in novel means for rotatably mounting the shaft designed to constitute the axle in ball-bearings of novel construction and in mounting the hubs of the wheels upon the shaft in a manner to cause their rotation therewith or to permit of their automatic disconnection, whereby either of the wheels may be rotated independently of the shaft—as, for instance, when it is desired to make a sharp turn or when an obstruction is opposed to the wheel.

The invention consists in certain other details of construction and in the arrangement of parts hereinafter described and claimed.

Referring to the drawings, Figure 1 is a side elevation of my improved axle or shaft complete, showing the wheels mounted thereon; and Fig. 2 is a central longitudinal section therethrough.

Referring to the numerals on the drawings, 1 indicates the axle, mounted in bearing-boxes 2, carried in any suitable manner by the frame of the vehicle. These boxes are of cylindrical form and are provided, respectively, with a closed end 3, through which the shaft extends, and with an open end 4, internally screw-threaded and designed to receive an exteriorly-screw-threaded cap 5, loosely mounted upon the shaft and provided upon its inner face with an annular groove or ball-run 6, against which a circular series of balls 7 are designed to move.

8 indicates a bearing-plate within the bearing-box and provided upon its opposite sides with annular ballways 9 10, designed for the reception of the balls 7 and for a second series of balls 11 between the bearing-plate and the closed end of the box 2, which latter is similarly provided with a circular ballway 12. It will thus be seen that the shaft is supported at two or more points in journal-boxes provided with ball-bearings composed, respectively, of two series of balls rotated between the opposite sides of a bearing-plate and the closed end of the box and cap, respectively. If desired, suitable jam-nuts 13 may be screwed against the outer faces of the caps to assist in their retention in their adjusted positions within the bearing-boxes to prevent the vibration of the balls. The shaft so mounted is provided with a pair of oppositely-disposed ratchet or clutch flanges 14, preferably of conical form and fixed to the shaft contiguous to the outer side of the bearing-boxes, thereby constituting, in effect, limiting means for preventing longitudinal movement of the shaft.

15 15 indicate the wheels, and 16 16 the hubs, loosely mounted upon the ends of the shaft and provided, respectively, with ratchet or clutch teeth 17ᵃ upon their inner ends, designed normally to be urged into engagement with the flanges 14 by springs 17, which encircle the extremities of the shaft between terminal adjustment-nuts 18 and compression-plates 19, bearing against the outer ends of the hubs.

20 indicates a protective casing secured upon the inner end of each of the hubs and designed to inclose and protect the clutch formed by the ratchet collar and flange.

It will now be apparent that when a vehicle provided with running-gear constructed in accordance with my invention is propelled the wheels being in fixed engagement with the shaft through the medium of the clutch mechanism described will revolve with the shaft with the least possible resistance being opposed to the movement of the parts by reason of the antifriction or ball bearings within which the shaft turns; but if it is desired to make a quick turn and the shaft is suddenly shifted, reversing the direction of movement of its ends, the wheels will be compelled to turn at different rates of speed and perhaps in opposite directions, as this is made possible by the clutches. In engagement the inclined faces of the ratchet-teeth will cause the wheel or wheels, as the case may be, to be forced against the resistance of the spring or springs out of engagement with the ratchet-flanges, and the wheel may then rotate independently of the shaft. Whenever the vehicle is again propelled in the forward direction, the springs will immediately throw the wheels into engagement with the flange upon the shaft and the initial organization of the device will be restored.

If in use the shaft becomes worn by the movement of the balls within the bearing-boxes, the latter may be easily adjusted upon the shaft to present a new surface, the conical ratchet-flanges being likewise adjusted to contact with the sides of the boxes and the terminal adjustment-nuts upon the shafts being adjusted to exert the proper tension upon the spring to compensate for the adjustment; but, while the present embodiment of my invention appears at this time to be preferable, I do not desire to limit myself to the structural details set out, but reserve the right to change, modify, or vary them at will within the scope of the protection prayed.

Having thus described my invention, what I claim as new, and desire to secure by Letters Patent, is—

1. The combination with journal-boxes, of an axle mounted therein and provided with adjustable ratchet-flanges in contact with said boxes, hubs provided with ratchet-collars designed to engage the flanges, and means for yieldingly urging the hubs in the direction of the flanges, substantially as specified.

2. The combination with a journal-box provided with a closed end and with a cap screwed into its opposite end, of a bearing-plate within the box and balls arranged upon opposite sides of the bearing-plate, substantially as specified.

3. The combination with journal-boxes provided respectively with a closed end, a cap, and an intermediate bearing-plate, balls arranged upon opposite sides of the bearing-plate, an axle passing axially through the cap, the closed end of the box and bearing-plate, and an adjustable flange upon the shaft designed to contact with one side of the journal-box, substantially as specified.

4. The combination with a journal-box provided with a closed end, an adjustable cap and an intermediate bearing-plate, of balls arranged upon opposite sides of the bearing-plate, an axle passing axially through the journal-box, a conical ratchet-flange adjustable upon the axle and designed to bear against the journal-box, a hub provided with a ratchet-collar designed to engage the ratchet-flange, an adjustment-nut screwed upon the extremity of the axle, a compression-plate imposed against the outer end of the hub, and a spring intermediate of the compression-plate and nut, substantially as specified.

In testimony whereof I affix my signature in presence of two witnesses.

PATRICK SHARKEY.

Witnesses:
J. C. FEASTER,
J. J. MOORE.